(12) United States Patent
Pechacek et al.

(10) Patent No.: US 11,023,838 B2
(45) Date of Patent: Jun. 1, 2021

(54) ISSUE TRACKING SYSTEMS AND METHODS

(71) Applicant: ATLASSIAN PTY LTD, Sydney (AU)

(72) Inventors: Taylor Pechacek, Sydney (AU);
Rodrigo Berto, Sydney (AU); Oliver Burn, Sydney (AU); Benjamin Morgan, Brisbane City (AU); James Navin, Sydney (AU); Boris Gvozdev, Sydney (AU); Christian Rolf, Sydney (AU); Daniel Kerris, Sydney (AU); Amy Dittmar, Sydney (AU); Dmitry Pak, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 358 days.

(21) Appl. No.: 16/206,792

(22) Filed: Nov. 30, 2018

(65) Prior Publication Data

US 2020/0104773 A1     Apr. 2, 2020

Related U.S. Application Data (60) Provisional application No. 62/737,942, filed on Sep. 28, 2018.

(51) Int. Cl.
*G06F 9/44* (2018.01)
*G06Q 10/06* (2012.01)
*G06Q 10/10* (2012.01)

(52) U.S. Cl.
CPC . *G06Q 10/06316* (2013.01); *G06Q 10/06313* (2013.01); *G06Q 10/101* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 5,903,897 A * | 5/1999 | Carrier, III | ................ G06F 8/71 |
| 6,195,795 B1 | 2/2001 | Block | |
| 6,256,773 B1 | 7/2001 | Bowman-Amuah et al. | |

(Continued)

OTHER PUBLICATIONS

Pechacek, U.S. Appl. No. 16/369,870, filed 03/269/2019, Final Office Action dated Jun. 12, 2020.

(Continued)

*Primary Examiner* — Anna C Deng
(74) *Attorney, Agent, or Firm* — Brownstein Hyatt Farber Schreck, LLP (57) ABSTRACT

In an embodiment, a computer implemented method comprises receiving, by an issue tracking system, a request to associate an issue maintained by the issue tracking system with a feature flag maintained by a feature flag system; generating, by the issue tracking system, feature flag system issue data; effecting, by the issue tracking system, a redirect to the feature flag system and communicating the feature flag system issue data to the feature flag system; receiving, by the issue tracking system, a feature flag update from the feature flag system; processing, by the issue tracking system, the feature flag update to derive feature flag data therefrom; and associating, by the issue tracking system, the feature flag data with the issue.

17 Claims, 4 Drawing Sheets

(56) References Cited

U.S. PATENT DOCUMENTS

| | | | |
|---|---|---|---|
| 6,487,713 B1 * | 11/2002 | Cohen | G06F 8/34 |
| | | | 717/105 |
| 7,437,722 B2 | 10/2008 | Poole et al. | |
| 8,548,967 B1 | 10/2013 | Poole | |
| 10,162,740 B1 * | 12/2018 | Setty | G06F 8/60 |
| 10,395,117 B1 * | 8/2019 | Zhang | G06K 9/00671 |
| 2006/0236301 A1 | 10/2006 | Minium | |
| 2007/0006041 A1 | 1/2007 | Brunswig | |
| 2007/0011649 A1 | 1/2007 | Venolia et al. | |
| 2009/0324013 A1 * | 12/2009 | Tanaka | G06T 7/207 |
| | | | 382/103 |
| 2010/0325602 A1 * | 12/2010 | Kraft, IV | G06F 8/71 |
| | | | 717/103 |
| 2013/0036402 A1 | 2/2013 | Mutisya | |
| 2014/0325278 A1 | 10/2014 | Omar | |
| 2015/0019564 A1 | 1/2015 | Higginson et al. | |
| 2015/0081572 A1 | 3/2015 | Thomas et al. | |
| 2015/0082293 A1 | 3/2015 | Thomas et al. | |
| 2017/0132545 A1 | 5/2017 | Michaely | |
| 2017/0168870 A1 | 6/2017 | Allan et al. | |
| 2018/0121182 A1 | 5/2018 | Owen et al. | |
| 2018/0173510 A1 | 6/2018 | Koshkin | |
| 2018/0270122 A1 | 9/2018 | Brown | |

OTHER PUBLICATIONS

Pechacek, U.S. Appl. No. 16/36,843, filed Mar. 29, 2019, Office Action dated Jul. 10, 2020.
Pechacek, U.S. Appl. No. 16/369,870, filed Mar. 29, 2019, Office Action dated Feb. 4, 2020.

* cited by examiner

ISSUE TRACKING SYSTEMS AND METHODS

BENEFIT CLAIM

This application claims the benefit under 35 U.S.C. 119(e) of provisional application 62/737,942, filed Sep. 28, 2018, the entire contents of which are hereby incorporated by reference as if fully set forth herein.

TECHNICAL FIELD

The present disclosure is directed to issue tracking systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

One software development/release methodology available to software development teams is a continuous delivery methodology. Generally speaking, a continuous delivery methodology involves maintaining a software code base in a form that can be reliably released at any time—and, typically, releasing software revisions to the live/production environment relatively frequently (compared to traditional software development approaches).

Adoption of a continuous delivery approach is often accompanied by the use of feature flags (also referred to as, for example, feature toggles, feature switches, conditional features). A given feature flag relates to deployed source code which (on execution) provides one or more features in a software product. The feature flag essentially provides a conditional logic wrapper to the source code that enables it to be switched on (i.e. made available) or off (i.e. made unavailable). For example, when a feature flag is set to true, the software product when executed makes the feature(s) associated with that flag available. Conversely, when a feature flag is set to false, the software product when executed makes the feature(s) associated with that flag unavailable. This provides software developers the ability to control whether features included in a deployed/released code base are available or unavailable to customers (i.e. end users of the software product).

The use of feature flags provides a number of advantages. For example, feature flags allow software developers granular control over how a given feature is actually made available to customers. Using a feature flag, delivery of a feature may be controlled, for example, to specific customers, customers in a specific user tier, customers in a particular geographic region, customers with a particular product configuration, a set number/percentage of random customers. This allows for software testing and user acceptance testing by a selected group or segment of customers before the feature is rolled out to a wider customer base. As another example, where availability of a feature is controlled by a feature flag, the feature can easily be rolled back (made unavailable) in the event that customer feedback is sufficiently negative or an issue with the feature is identified.

SUMMARY

The appended claims may serve as a summary of the invention.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, the use of feature flags in software development/release methodologies is becoming more common.

Various software products/systems have been developed to assist with using feature flags—for example LaunchDarkly and Rollout. For ease of reference, products/systems such as these will be referred to as feature flag systems. Generally speaking, feature flag systems provide mechanisms for controlling the roll out and roll back of features enabled by feature flags. In LaunchDarkly, for example, roll out of a feature is controlled by customizable target rules which dictate when, and to what users/user groups, features behind feature flags made available.

While feature flag systems are useful, making sure that relevant information on a feature roll out/back is available to relevant stakeholders in an efficient and convenient manner can be problematic.

For example, the stakeholders involved in the release/intended release of a given feature could include: conception stakeholders who conceive the feature; development stakeholders who develop the feature; quality assurance stakeholders who review/test the feature; release approval stakeholders who approve the source code in respect of the feature for release (i.e. inclusion in the deployed version of the product's the code base); roll-out approval stakeholders who approve the feature for actual activation/roll out to one or more customers; marketing stakeholders responsible for promoting the launch of the feature; support stakeholders offering customer support for the feature once rolled out.

Providing the most up to date information around feature roll out to a potentially large group of stakeholders can be difficult. For example, consider a customer who is seeking support for a software product, but support cannot tell what features are enabled/disabled in that customer's product. In this case support's ability to assist the customer is compromised. As another example, consider a scenario where marketing is planning a launch campaign around a particular feature but cannot tell whether the feature has been made available to no end users, some end users, or all end users. As a further example, consider a conception or developer stakeholder who simply wants to see whether a feature they were involved in has been rolled out. They may (or may not) be able to easily determine whether the source code in respect of the feature has been deployed to a production environment, but where the feature is behind a feature flag this does not necessarily mean that the feature has been rolled out to/activated for any customers.

Another common system used in software development is an issue tracking system. One example of such a system is Jira, commercially available from Atlassian.

Very generally speaking, issue tracking systems such as Jira allow users to perform various actions with respect to issues—for example, create issues, associate issues with projects and/or other issues, transition issues between workflow states, add/edit information associated with issues, assign issues to specific people/teams. Issue tracking systems also allow for management of an issue, for example user permissions defining: users that can see an issue and its associated information; users who can edit an issue; users who can transition an issue into/out of a particular workflow state; users who should be automatically notified any time an issue changes (either any change or a particular change), etc.

One common use scenario for issue tracking systems is to set up projects corresponding to software products (e.g. project A corresponds to software product A). A person or team who comes up with an idea for a new feature for software produce A (feature A) may then create an issue (or set of related issues) for the feature and associate the issue with project A. As development of feature A progresses (e.g. planned, developed, tested, released, enabled, marketed, supported, etc.), the feature B issue transitions through various workflow states with information being added to the issue by the relevant stakeholders.

Because of this, the issue as maintained by the issue tracking system can be configured to serve as a nexus for the software product and feature in question. With appropriate permissions set, any stakeholder can access the issue (i.e. feature A) and immediately determine the most current information.

Historically, however, issue tracking systems have not been integrated with feature flag systems and, as a result, feature flag information in re respect of a feature (e.g. whether the feature has been rolled out or not) could not be discerned or accessed from issue tracking systems. Instead, any stakeholder interested in feature flag information in respect of a feature would somehow need to first determine whether the feature was set up with a feature flag or not, and if so: determine what system was used to manage the feature flag; whether the stakeholder in question has access to the feature flag system (and, if so, how/using what credentials); if the stakeholder does not have access to the feature flag system, determine whether they can obtain access to it (and, if so, how/by what process); if and when the stakeholder accesses the feature flag system, determine how the feature in question is identified in that system; etc.

The embodiments described herein improve the ability of issue tracking systems to act as a nexus for software features. Generally speaking the embodiments provide for issues to be associated with feature flags in the issue tracking system. In certain embodiments this allows feature flag information in respect of an issue to be provided directly by the issue tracking system (e.g. in a user interface thereof). In certain embodiments it additionally (or alternatively) facilitates direct access to a specific feature flag in the feature flag system from the issue tracking system.

An overview of one example environment illustrating different systems involved in certain embodiments will be described, followed by a description of a computer system which can be configured in various ways to perform the embodiments/various features thereof as described herein. Operations for associating an issue with a feature flag will then be described, followed by operations for updating an issue with feature flag event information, then operations involved in user interaction with an issue that has been associated with a feature flag.

Environment Overview

Figure 1:
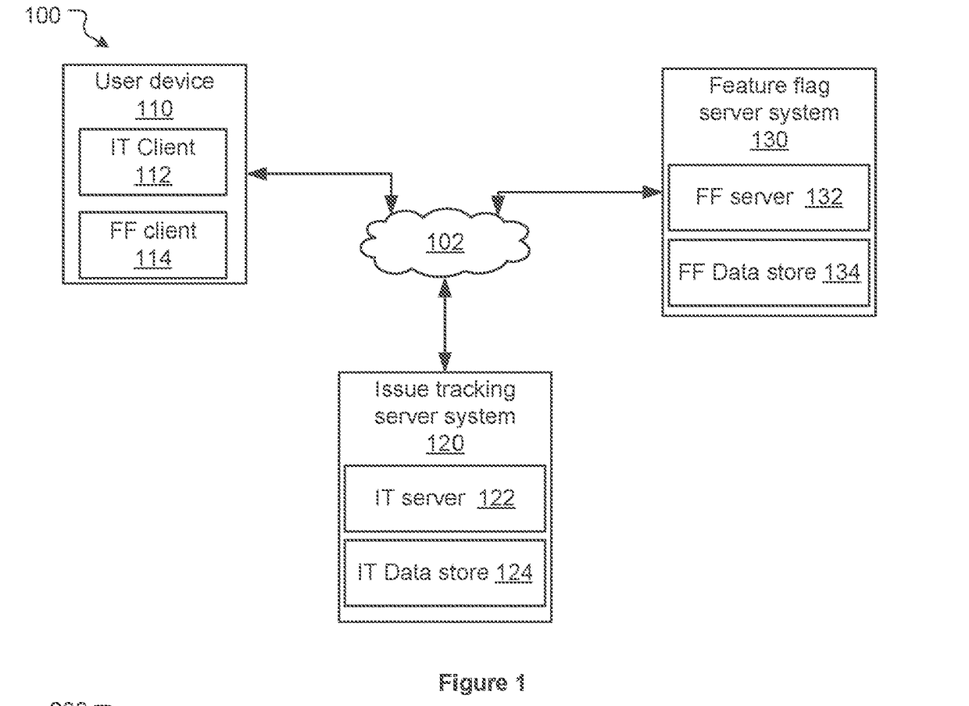
FIG. 1 is a block diagram of a networked environment according to aspects of the present disclosure.

FIG. 1 illustrates an example environment 100 in which embodiments and features of the present disclosure are implemented. Example environment 100 includes a communications network 102 which interconnects a user device 110, an issue tracking server system 120, and a feature flag server system 130.

For ease of reference, the acronym IT will be used herein in place of "issue tracking", and the acronym FF will be used herein in place of "feature flag".

User device 110 is a computer processing system with an IT client application 112 and a FF client application 114 installed thereon. User device 110 will also have other applications installed/running thereon, for example an operating system.

When executed by the user device 110 (e.g. by a processor such as processor 204 described below), the IT client application 112 configures the user device 110 to provide client-side IT system functionality. This involves communicating (using a communication interface such as 218 described below) with the IT server system 120 (and, in particular, the IT server 122). IT client 112 may be a dedicated application client that communicates with an IT application server using an API. Alternatively, IT client 112 may be a web browser (such as Chrome, Safari, Internet Explorer, Firefox, or an alternative web browser) which communicates with an IT web server using http/https protocols.

When executed by the user device 110 (e.g. by a processor such as processor 204), the FF client application 114 configures the user device 110 to provide client-side FF system functionality. This involves communicating with the FF server system 130 (and, in particular, the FF server 132). FF client 114 may be a dedicated application client that communicates with a FF application server using an API. Alternatively, FF client 114 may be a web browser which communicates with a FF web server using http/https protocols.

While user device 110 has been shown with separate IT and FF clients 112 and 114, a single application may be used as both IT and FF client (e.g. a web browser, in which case the IT and FF servers 122 and 132 are web servers).

User device 110 may be any form of computing device. Typically, user device 110 will be a personal computing device—e.g. a desktop computer, laptop computer, tablet computer, and in some instance even a mobile phone. While a single user device 110 has been illustrated, an environment would typically include multiple user devices 110 interacting with the IT server system 120 and/or FF server system 130.

IT server system 120 includes an IT server 122 and an IT data store 124. The IT server 122 configures the IT server system 120 to provide server-side IT system functionality—e.g. by receiving and responding to requests from IT clients (e.g. client 112) and storing/retrieving data from the IT data store 124 as required.

IT server 122 may be a web server (for interacting with web browser clients) or an application server (for interacting with dedicated application clients). While IT server system 120 has been illustrated with a single server 122 it may provide multiple servers (e.g. one or more web servers and/or one or more application servers).

In certain embodiments, IT server system 120 is a scalable system including multiple distributed server nodes connected to the shared data store 124 (e.g. a shared file server). Depending on demand from clients (and/or other performance requirements), IT server system 120 server nodes can be provisioned/de-provisioned on demand to increase/decrease the number of servers offered by the IT server system 120. Each IT server 122 may run on a separate computer system and include one or more application programs, libraries, APIs or other software that implement server-side functionality. Similarly, IT data store 124 may run on the same computer system as an IT server 122 or may run on its own dedicated system (accessible to IT server(s) 122 either directly or via a communications network).

The IT server 122 (running on IT server system 120) and IT client 112 (running on user device 110) operate together to provide an IT system/IT system functionality. Operations described herein as IT operations or operations being performed by the IT system may be performed by the IT client 112 (operating on user device 110), the IT server 122 (operating on IT server system 120) or the IT client 112 and IT server 122 in cooperation. For example, IT operations involving the display of user information involve displaying information on the user device 110 (e.g. on a display such as 212) as controlled by the IT client 112. The data displayed, however, may be generated by the IT client 112 itself, or generated by the IT server 122 and communicated to the IT client 112 therefrom. As a further example, IT operations involving user input involve the user device 110 receiving user input (e.g. at input device 214) and passing that input to the IT client 112. The information input may be processed by the IT client 112 itself or communicated by the IT client 112 to the IT server 122 to be processed by the IT server 122. IT operations involving writing data to the IT data store 124 involve the IT server 122. The data written to the IT data store 124 may, however, be communicated to the IT server 122 by the IT client 112.

FF server system 130 includes an FF server 132 and an FF data store 134. The FF server 132 configures the FF server system 130 to provide server-side FF system functionality—e.g. by receiving and responding to requests from FF clients (e.g. client 122) and storing/retrieving data from the FF data store 134 as required.

FF server 132 may be a web server (for interacting with web browser clients) or an application server (for interacting with dedicated application clients). While FF server system 130 has been illustrated with a single server 132 it may provide multiple servers (e.g. one or more web servers and/or one or more application servers).

In certain embodiments, FF server system 130 is a scalable system including multiple distributed server nodes connected to the shared data store 134 (e.g. a shared file server). Depending on demand from clients (and/or other performance requirements), FF server system 130 server nodes can be provisioned/de-provisioned on demand to increase/decrease the number of servers offered by the FF server system 130. Each FF server 132 may run on a separate computer system and include one or more application programs, libraries, APIs or other software that implement server-side functionality. Similarly, FF data store 134 may run on the same computer system as an FF server 132 or may run on its own dedicated system (accessible to FF server(s) 132 either directly or via a communications network).

The FF server 132 (running on FF server system 130) and FF client 114 (running on user device 110) operate together to provide a FF system/FF system functionality. Generally speaking, operations described herein as FF operations may be performed by the FF client 114 (operating on user device 110), the FF server 132 (operating on FF 123) or the FF client 114 and FF server 132 in cooperation. FF operations involving the display of user information involve the user device 110 as controlled by the FF client 114. The data displayed, however, may be generated by the FF client 114 itself, or generated by the FF server 132 communicated to the FF client 114. Similarly, FF operations involving user input involve the user device 110 receiving user input (e.g. at input device 214) and passing that input to the FF client 114. The information input may be processed by the FF client 114 itself or communicated by the FF client 114 to the FF server 132 to be processed by the FF server 132. FF operations involving writing data to the FF data store 134 involve the FF server 132. The data written to the FF data store 134 may, however, be communicated to the FF server 132 by the FF client 114.

Communications between the various systems in environment 100 are via the communications network 102. Communications network may be a local area network, public network (e.g. the Internet), or a combination of both.

While environment 100 has been provided as an example, alternative system environments/architectures are possible.

Hardware Overview

The embodiments and features described herein are implemented by one or more special-purpose computing systems or devices. For example, in environment 100 each of the user device 110, IT server system 120, and FF server system 130 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
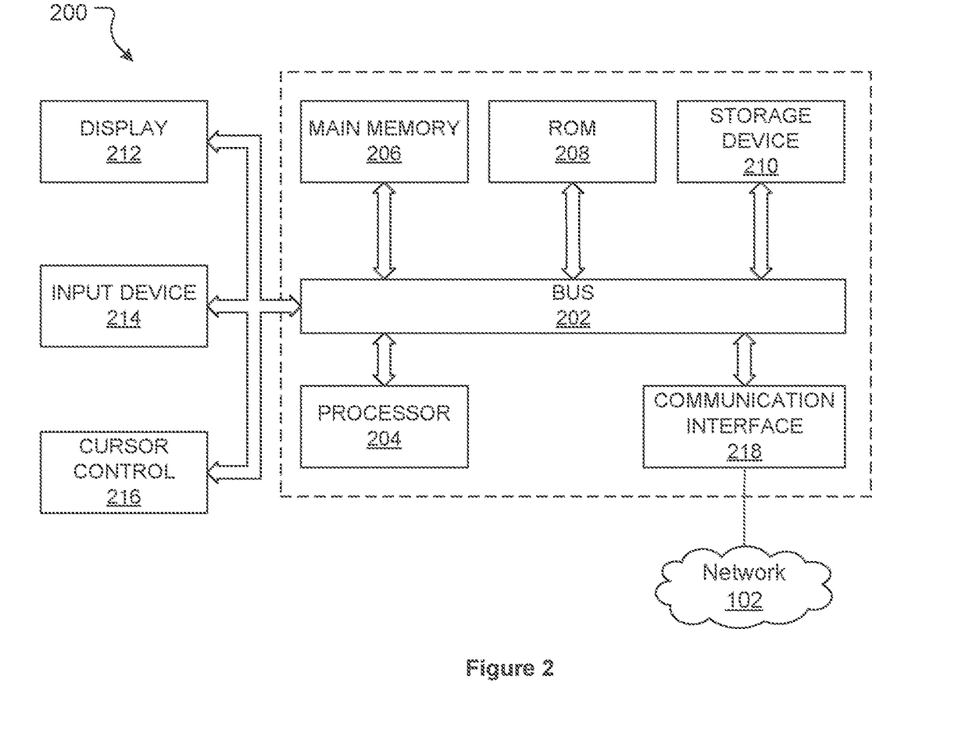
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general-purpose microprocessor, a graphical processing unit, or other processing unit.

Computer system 200 also includes a main memory 206, such as a random-access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as IT server system 120 or FF server system 130), it will typically be provided with higher end hardware allowing it to process data, access memory, and perform network communications more rapidly than, for example, a user device (such device 110).

Association of Issues and Feature Flags

This section describes the processing performed in order to associate an issue maintained by IT server system 120 with a feature flag managed by FF server system 130. The embodiments will be described with reference to Jira being the IT system and LaunchDarkly being the FF system. The principles and features described, however, may be applied to different IT and/or FF systems.

In certain embodiments, an IT system user goes through an initial configuration process in order to configure their IT client 112/account to be able to receive information from the FF server system 130. The precise way in which this is done will depend on the IT server system 120 and FF server system 130 in question, and the manner in which communication between the systems is to be achieved.

In certain embodiments, the FF server system 130 is configured to communicate with the IT sever system 120 via API calls. In this case, configuring access for the FF server system 130 involves configuring the IT server system 120 to permit incoming API calls from the FF system 130.

Once the IT system 120 has been configured, the user can associate issues maintained by the IT system (e.g. by the IT server system 120 storing data on the IT data store 124) with feature flags managed by the FF system.

Figure 3:
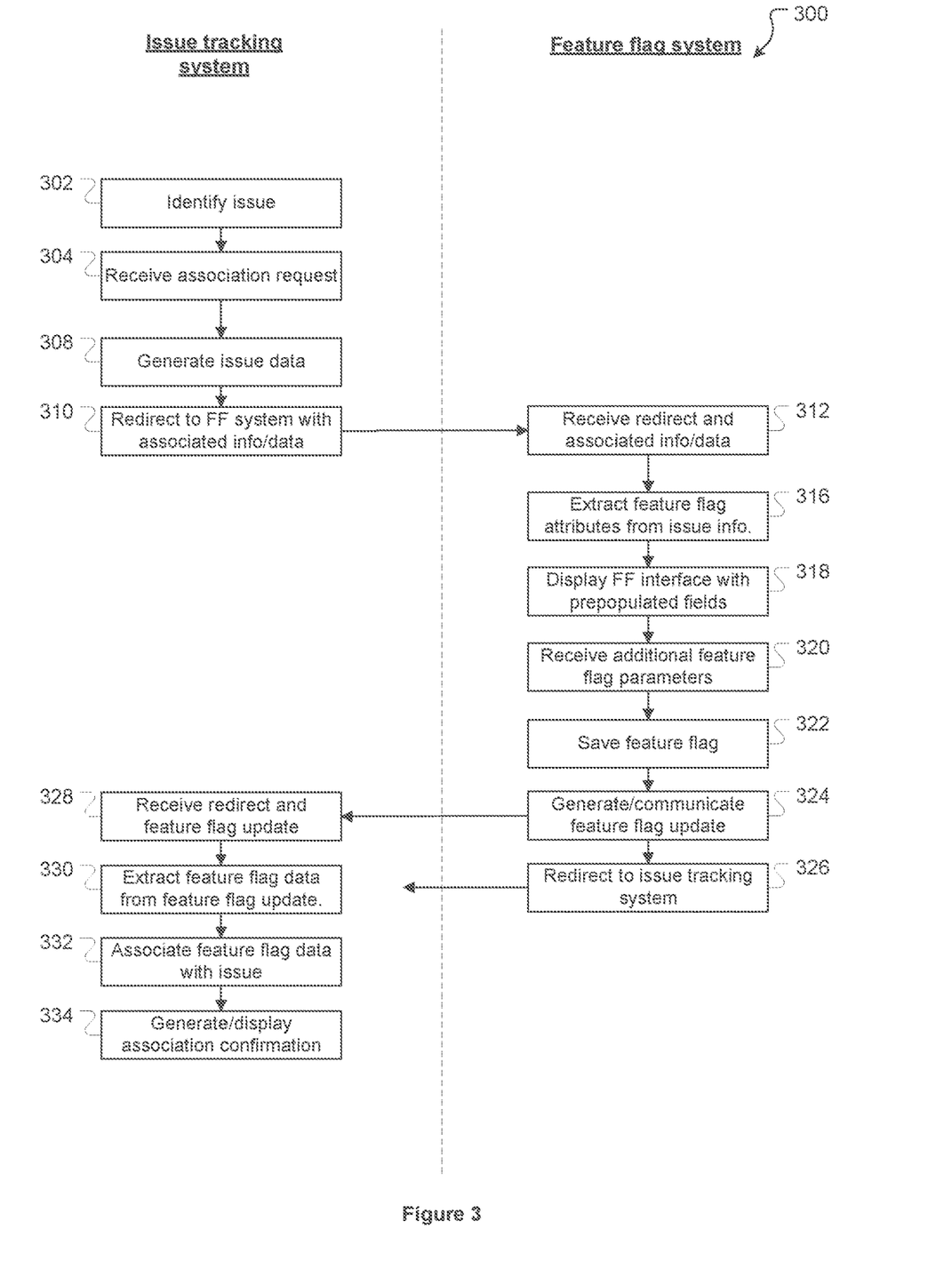
FIG. 3 is a flowchart indicating operations performed to associate an issue maintained by an issue tracking system with a feature flag maintained by a feature flag system.

FIG. 3 provides a flowchart 300 illustrating operations performed in accordance with certain embodiments to create issue/feature flag associations.

FIG. 3 is generally divided into operations performed by the IT system (i.e. the IT client 112, the IT server 122, and IT data store 124) and operations performed by the FF system (i.e. the FF client 114, the FF server 132, and FF data store 134).

Figure 5:
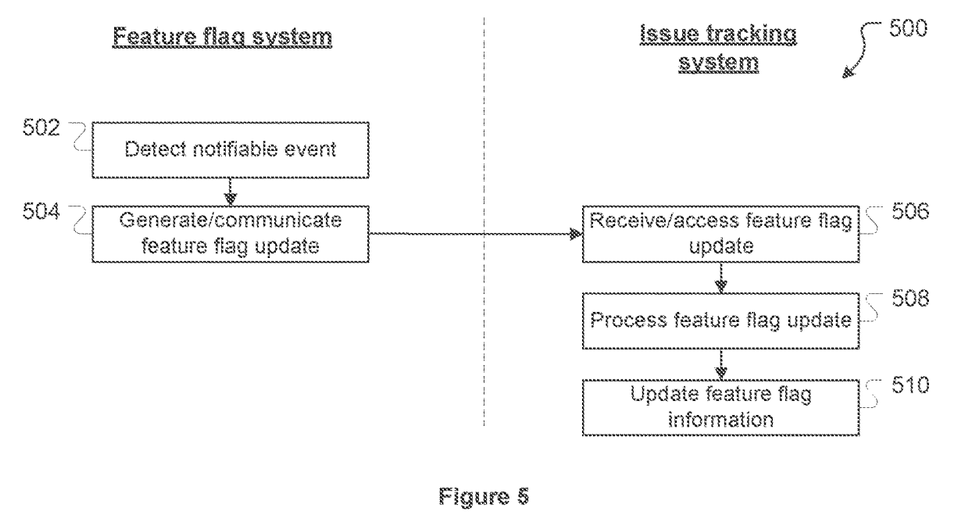
FIG. 5 is a flowchart indicating operations performed to update an issue tracking system with feature flag information.
Figure 6:
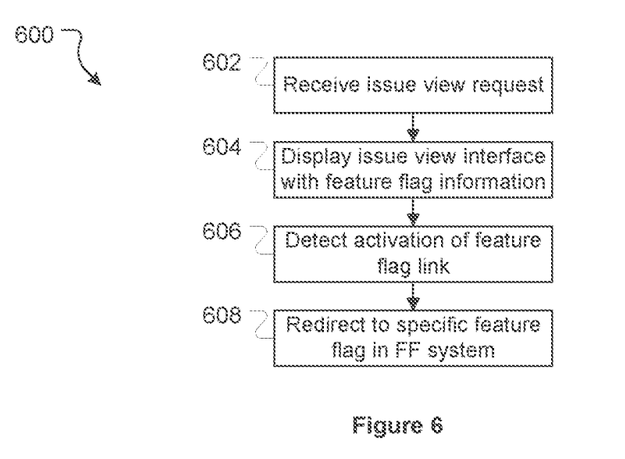
FIG. 6 is a flowchart indicating operations performed to view and interact with feature flag information at an issue tracking system.

The operations in flowchart 300 (and flowcharts 500 and 600 below) involve generation, communication, and use of various issue data and feature flag data. For convenience, the following naming convention will be used: issue information used/stored by the IT system will be referred to as ITS issue data; issue information used/stored by the FF system will be referred to as FFS issue data; feature flag information used/stored by the FF system will be referred to as FFS feature data; and feature flag information used/stored by the IT system will be referred to as ITS feature data.

Furthermore, where the FF server 132 is described as storing FFS issue data in the FF data store 134, the data stored may be data extracted directly from the FFS issue data or generated based on the FFS issue data. Similarly, where the IT server 122 is described as storing ITS feature data in the IT data store 124, the data stored may be data extracted directly from the ITS feature data or generated based on the ITS feature data.

At 302, an issue that is to be associated with a feature flag is identified. Typically, this identification will be achieved by user interaction with a user interface provided on the user device 110 by IT client 112 (in communication with IT server 122). Such interaction may be by normal IT system mechanisms, e.g. searching or browsing for a particular issue via a navigation interface.

At 304, the IT client receives (in response to operation of user device 110 by a user) receives an association request to associate the issue identified at 302 with a feature flag. In the present embodiment, an association request may be a request to associate the issue with a new feature flag or to associate the issue with an existing feature flag. In alternative embodiments only one or the other of these options may be provided.

Figure 4:
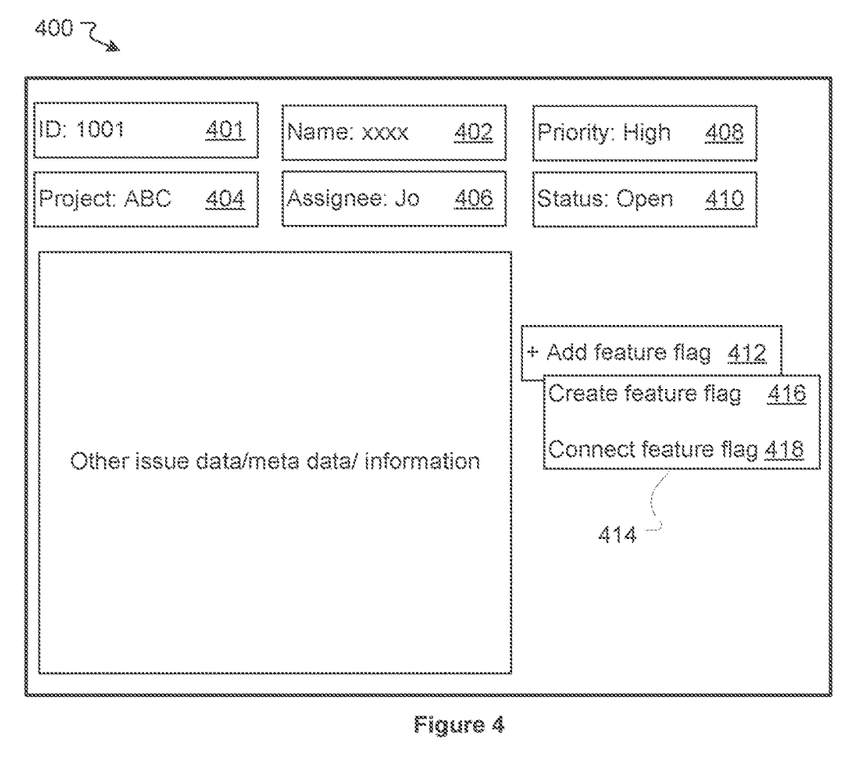
FIG. 4 is an example issue tracking system user interface for associating an issue with a feature flag.

FIG. 4 provides one example of an issue view user interface 400 configured to facilitate association of an issue with a feature flag. User interface 400 is generated by IT client 112 (drawing information such as ITS issue data from IT server 122) which causes the interface to be displayed by the user device 110 (e.g. on a display such as 212). User interface 400 generally includes ITS issue data such as a unique issue identifier 401, an issue name 402, a project name 404 (i.e. the parent project to which the issue belongs), an issue assignee 406, an issue priority 408 (e.g. highest, high, medium, low, lowest), an issue's workflow status 410 (e.g. open, in progress, reopened, resolved, closed). User interface 400 further includes user controls, including a feature flag association control 412 which in this case is provided with the text "+ Add feature flag"). In this embodiment when a user activates the feature flag association control 412 (e.g. by contacting, clicking, hovering, keyboard shortcut, or alternative interaction with the control) the IT client 112 is configured to generate a display a sub-menu 414 with two further controls: a create feature flag control 416 (activation of which is received as a request to associate the issue with a new feature flag) and a connect feature flag control 418 (activation of which is received as a request to associate the issue with an existing feature flag). Alternative user interfaces are, of course, possible, displaying additional and/or alternative ITS issue data and/or controls.

At 308, the IT system generates FFS issue data to be communicated to the FF server system 130 (either directly or via the FF client 114). As described below, the FFS issue data is used by the FF server system 130 to automatically populate information in the feature flag that is being created or connected to. The specific FFS issue data generated, therefore, depends on the IT/FF systems in question. By way of example, the FFS issue data may include an issue identifier/key and issue summary.

At 310, the IT system effects a redirect to the FF system. This redirection may be controlled by the IT client 112 or the IT server 122 and may be achieved in various ways depending on the nature of the IT and FF clients 112 and 114. For example, where the IT and FF clients 112 and 114 are both web clients (i.e. accessed from a single web browser application), redirection to the FF system is achieved in the browser—e.g. by opening a new tab with a URL pointing to the FF server system 130. Alternatively, where IT and FF clients 112 and 114 are dedicated application clients, redirection to the FF server system 130 may involve automatically launching/opening the FF client 114.

In certain embodiments, the redirect to the FF system at 310 is via a URL which includes the issue data generated at 308 as parameters.

For example, and returning to user interface 400 described above, activation of the create feature flag control 416 causes the IT system to generate and submit a URL to the FF system that includes issue data in respect of the issue currently being viewed—for example a URL such as: "https://FFsystem.com/integration/ITsystem/create?issueKey={issue.key}" (the {issue.key} parameter being populated according to the key of the issue currently being viewed). Similarly, activation of the connect feature flag control 418 causes the IT system to generate and submit a URL to the FF system such as: "https://FFsystem.com/integration/ITsystem/link?issueKey={issue.key}" (the {issue.key} parameter again being populated according to the key of the issue currently being viewed).

At 312, the FF server 132 receives the redirect and associated data from the IT system (e.g. the FFS issue data). Per the above example, the redirect may be to different pages served by the FF system. For example, the URL generated by the IT system when a user activates the create feature flag control 412 may point to a 'create new feature flag page' served by the FF system, while the URL generated by the IT system when a user activates the connect feature flag control 418 may point to a 'select existing feature flag page'.

At 316, the FF system processes FFS issue data received from the IT system (e.g. in the URL) to extract/generate based thereon feature flag attributes that will be associated with the feature flag that is to be created or edited. Generally, the FF server 132 will be configured to perform this processing, but in alternative embodiments the FF client 114 could be configured to do so.

At 318, the FF client 114 causes the user device 110 to display a feature flag interface. Per the above, where the association request was a request to associate the issue with a new feature flag, the feature flag interface will be an interface for creating a new feature flag. Where the association request was a request to associate the issue with an existing feature flag, the feature flag interface will be an interface for editing an existing feature flag. The existing feature flag may be identified based on information received from the IT system (e.g. as entered by the user via the IT client 112 and passed as a parameter in the redirection URL) or may be identified through user interaction with the FF client 114 (e.g. searching for or navigating to an existing feature flag via a user interface provided by the FF client 114).

The feature flag interface includes a number of data fields (some static, some user-editable) relating to attributes of the feature flag being generated/created. Data fields in respect of attributes extracted/generated at 316 are automatically prepopulated by the FF system with the data extracted/generated from the received issue information.

The specific feature flag attributes and data fields displayed in the feature flag interface will depend on the feature flag system being used. By way of specific example, feature flag attributes/data fields that are prepopulated include an issue identifier/key and an issue summary. Continuing with the above example, this information may be passed to the FF system 130 as query parameters in a URL.

At 320, the user interacts with the feature flag interface to define further attributes in respect of the feature flag being created/edited. The interaction required/possible here will, again, depend on the feature flag system being used. By way of example, however, the user may be able to configure various parameters of the feature flag such as: tags/labels for categorizing the feature flag; a feature flag type—e.g. a binary feature flag (which can only have an on/off or true/false state) or a multivariate feature flag (which allows for conditional logic to be applied to the feature flag); whether the flag is permanent or transitory; targeting parameters/rules (allowing specific users/user groups to be targeted).

In alternative embodiments, instead of interacting with the feature flag interface to define further parameters, the IT system may be configured to provide an interface (e.g. at 304) in which a user is requested to enter additional feature flag parameters. In this case the additional feature flag parameters are communicated to the FF server 132 (e.g. as part of the redirect) and prepopulated into the feature flag interface by the FF system.

At 322, the user interacts with the FF interface to save the feature flag being created/edited (e.g. by activating a save control or similar). This results in all feature flag information (e.g. attributes extracted/generated from the issue information at 316 and any attributes/parameters entered by the user at 320) being written to the FF data store 134.

At 324, the FF system generates a feature flag update which includes ITS feature data and communicates that update to the IT system.

The specific ITS feature flag data generated, and the format of the update will depend on the particular IT and FF systems used. By way of one specific example, however, table A below provides an example feature flag update (in cURL format) that can be used to provide feature flag data to the Jira IT system:

TABLE A

Example feature flag update curl --request POST \
   --url 'https://your-domain.atlassian.net/rest/featureflags/0.1/bulk' \
   --user 'email@example.com:' \
   --header 'Accept: application/json' \
   --header 'Content-Type: application/json' \
   --data '{
"properties": {
   "accountId": "account-234",
   "projectId": "project-123"
},
"flags": [
   {
     "schemaVersion": "1.0",
     "id": "111-222-333",
     "key": "my-awesome-feature",
     "updateSequenceId": 1523494301448,
     "displayName": "Enable awesome feature",
     "issueKeys": [
       "ISSUE-123"
     ],
     "summary": {
       "url": "https://example.com/project/feature-123/summary",
       "status": {
         "enabled": true,
         "defaultValue": "Disabled",
         "rollout": {
           "percentage": 80
         }

TABLE A-continued

Example feature flag update

},
       "lastUpdated": "2018-01-20T23:27:25+00:00"
     },
     "details": [
       {
         "url": "https://example.com/project/feature-123/production",
         "lastUpdated": "2018-01-20T23:27:25+00:00",
         "environment": {
           "name": "prod-us-west",
           "type": "production"
         },
         "status": {
           "enabled": true,
           "defaultValue": "Disabled",
           "rollout": {
             "percentage": 80
           }
         }
       }
     ]
   }
]
}

The following paragraphs describe the API schema used in the feature flag update shown in Table A. It will be appreciated that this is by way of specific example only. Alternative schemas capturing additional, reduced, or alternative feature flag data (in the same or alternative ways) are possible.

The 'properties' object can be used to provide arbitrary properties that submitted feature flags are tagged with. These properties can be used, for example, for delete operations to clean up all feature flags associated with an account in the event that the account is removed from the FF system.

The 'flags' array provides a list of feature flags and associated information (e.g. summary information and details information) to the IT system. Each feature flag may be associated with 1 or more IT system issue identifiers/keys and will also be associated with any properties included in the request.

Each element of the 'flags' array is an object providing data related to a single feature flag, across any environment that the flag is present in.

The 'schemaVersion' string in the 'flags' array object defines the FeatureFlagData schema version used for the feature flag data. Where no schema changes are anticipated (and there will only ever be one schema version) this string can be omitted.

The 'id' string in the 'flags' array object provides the identifier for the feature flag (the identifier being unique for a given feature flag provider).

The 'key' string in the example 'flags' array object provides a key for users to use to reference the feature flag in their source code etc. The key can be made available via a user interface (as discussed below) for users to copy into their source code etc.

The 'updateSequenceId' integer in the example 'flags' arrayobject provides an identifier that is used to apply an ordering to updates for the feature flag in the case of out-of-order receipt of update requests. In an example implementation, epoch millis from the FF system are used for the updateSequenceId. Other alternatives are, however, possible (e.g. a FF system store a counter against each feature flag and increment that on each update to the IT system). Updates for a Feature Flag that are received with an updateSequenceId lower than what is currently stored will be ignored.

The 'displayName' string in the example 'flags' array object provides a human-readable name for the feature flag. The displayName can be shown in the IT system UI as discussed below. The displayName string is optional, and if not provided the ID can be used for display.

The 'issueKeys' array in the example 'flags' array object provides one or more IT system issue keys to associate the feature flag information with.

The 'summary' object in the example 'flags' array object provides summary information for the feature flag. The summary object may be used in different ways. For example, the FF system may provide information from a specific environment or may choose to 'roll up' information from across multiple environments—depending on what is appropriate for the FF system. The summary information can be presented in the IT system UI as discussed below.

In the 'summary' object, the 'url' string provides a URL that can be used use to link to a summary view of the feature flag if appropriate. This could be any location that is appropriate for the FF system—for example, if the summary information comes from a specific environment linking the user to the flag in that environment may be appropriate.

In the 'summary' object, the 'status' object provides status information that can be presented in the IT system UI (as described below).

In the 'status' object, the 'enabled' Boolean provides information on whether the feature flag is enabled in the given environment (or in summary). Enabled may imply a partial rollout, which can be described using the 'rollout' field.

In the 'status' object, the 'defaultValue' string provides the value served by the feature flag when it is disabled. This could be the actual value or an alias, as appropriate. This value may be presented in the IT system UI (as described below).

In the 'status' object, the 'rollout' object provides details of the rollout for the feature flag in an environment (or in summary). If 'enabled' is false, this field will be ignored. If 'enabled' is true, this field can be provided to describe the rollout. In certain implementations, if 'enabled' is true and the 'rollout' field is missing, rollout will be assumed to be 100%.

In the 'rollout' object, the 'percentage' number may be used to provide a percentage rollout (for where the feature flag rollout can be expressed as a simple percentage).

In the 'rollout' object, a 'text' string may be used to provide status information that represents the rollout and that can be displayed in the IT system UI. This could, for example, be a named cohort.

In the 'rollout' object, a 'rules' integer may be used to provide a count of the number of rules active for the feature flag in an environment.

Returning to the 'summary' object, the lastUpdated string provides a timestamp that can be presented in the IT system UI as a summary of the state of the Feature Flag. The FF system may choose to supply the last-updated timestamp from a specific environment, or the 'most recent' last-updated timestamp across all environments—whatever is appropriate for the particular FF system.

Returning to the 'flags' array, each object of the array further includes 'details' array providing detail information for the feature flag. Each element of the 'details' array is an object providing details of a feature flag in a single environment.

Each object in the 'details' array includes a 'url' string defining a URL that users can use to link to the feature flag in the environment.

Each object in the 'details' array includes a lastUpdated string providing a timestamp at which the feature flag was last updated in the environment.

Each object in the 'details' array includes an 'environment' object providing information on the environment that the details of the feature flag are in respect of. The 'environment' object includes a 'name' string providing the name of the environment and optionally a 'type' string providing a type or category of the environment (e.g. deployment, testing, staging, production).

Each object in the 'details' array includes a 'status' object providing information on the status of the feature flag in the environment. The 'status' object includes an 'enabled' Boolean indicating whether the feature flag is enabled in the given environment and a 'rollout' object (similar to or the same as the 'rollout' object described above).

At 326, the FF system redirects the user back to the IT system. This redirection may be controlled by the FF client 114 or the FF server 132.

At 328, the IT server 122 receives the feature flag update from the FF system.

At 330, the IT server 122 processes the ITS feature flag update to extract (or generate based thereon) feature data to be associated with the issue.

At 332, the IT server 122 associates the ITS feature data extracted/generated at 330 with the issue originally identified at 302. This involves the IT server 122 saving the ITS feature data in the IT data store 124.

At 334, the IT client 112 displays a confirmation message to the user that the issue has been associated with a feature flag. Additional information in respect of the association may be displayed.

The operations described are in respect of associating an issue with a feature flag. In certain embodiments, the IT and FF systems are configured to allow a single issue to be associated with multiple feature flags and/or a single feature flag to be associated with multiple issues. This can be useful, for example, where a single issue relates to multiple features that are implemented behind feature flags or a single feature implemented behind a feature flag is related to multiple issues.

Operations 300 described above are in the context of a user associating an issue with a feature flag by initial interaction with the IT system. In an alternative context, a user may associate an issue with a feature flag by initial interaction with the FF system. Where the user is initially interacting with the FF system, the operations described with respect to flowchart 300 above are (in a very general sense) reversed. For example, and at a high level: the user is initially interacting with a FF user interface (provided by the FF client 114); via the FF user interface, a user activates an issue association control which causes the FF user interface to package up relevant data and redirect the user to the IT system (communicating the packaged data to the IT system); the IT system receives the data, authenticates the user, and extracts/generates data for association with the issue in question; the issue data is saved at the IT system before the user is redirected back to the FF system; at the FF system issue data received from the IT system is saved against the feature flag and the association of the feature flag with the issue is completed.

Updating Issue Tracking System with Feature Flag Events

Turning to FIG. 5, a flowchart 500 showing the operations performed to update the IT system when feature flag events occur at the FF system will be described. As with flowchart 300 above, flowchart 500 is divided into operations performed by the IT system and operations performed by the FF system.

At 502, the FF system detects occurrence of a notifiable event. Typically, this detection will be performed by the FF server 132 but may be performed by the FF client 114. In this context, a notifiable event is an event of a predefined type that occurs in respect of a feature flag that is associated with an issue. In some embodiments, the FF system 130 is configured to treat any update/change to a feature flag that is associated with an issue as a notifiable event. In other embodiments, the FF system 130 is configured to treat only certain events as notifiable events—for example a feature flag being deleted (i.e. so the given feature is no longer controllable by a feature flag), a feature flag being switched on or off (e.g. so the feature behind the feature flag is made available to/withdrawn from one or more users/user groups), the target rules in respect of a feature flag being changed.

At 504, the FF system (typically the FF server 132) generates a feature flag update and communicates the update to the IT system.

In certain embodiments the FF system notifies the IT system by generation/communication of an API call to the IT system—for example the feature flag update described above with respect to Table A. Alternative notification mechanisms may be used, however, for example a publication/subscription type mechanism or other notification mechanism.

By way of additional example, Table B provides an example of an update that can be generated/communicated by the FF system to cause the IT system to delete feature flag data currently stored by the IT system based on one or more feature flag identifiers.

TABLE B

Example for deleting feature flags by ID curl --request DELETE \
  --url 'https://your-domain.atlassian.net/rest/featureflags/0.1/flag/{featureFlagId}' \
  --user 'email@example.com:'

The cURL of Table B includes a featureFlagId' string which defines the feature flag to be deleted.

By way of further example, Table C provides an example update that can be generated/communicated by the FF system to cause the IT system to delete feature flag data currently stored by the IT system based on feature flags with one or more properties.

TABLE C

Example for deleting feature flags by property curl --request DELETE \
  --url 'https://your-domain.atlassian.net/rest/featureflags/0.1/bulkByProperties' \
  --user 'email@example.com:'

In some implementations, an updateSequenceId may also be used to control deletion (either by ID or by properties). In this case, only stored data with an updateSequenceId less than or equal to that provided will be deleted. This can be used help ensure submit/delete requests are applied correctly if issued close together.

At 506, the IT server 122 receives/accesses the feature flag update communicated by the FF server 132.

At 508, the IT server 122 processes the feature flag update to extract relevant information therefrom (or generate information based on information therein). The extracted/generated information includes issue identification information that allows the issue(s) that the update relates to be identified and event information in respect of the feature flag event that has occurred.

At 510, the IT server 122 uses the information extracted from the feature flag update to update one or more issues maintained by the IT system with the updated feature This involves saving the extracted/generated feature flag information to the IT data store 124, and depending on the update in question may involve updating certain feature flag details (for example any of the details included in the update API schema described above) or deleting feature flag information associated with an issue entirely.

Issue Display and Interaction

FIG. 6 is a flowchart 600 of operations performed by an IT system in displaying an issue that has been associated with a feature flag and facilitating interaction therewith.

At 602, the IT system receives a request to view an issue associated with a feature flag. Such interaction may be made through typical IT system mechanisms, e.g. an issue search/browsing interface provided via the IT client 112.

At 604, the IT client 112 causes the user device 110 to display an issue view interface. Amongst other issue information, the issue view interface provides certain ITS feature information that is associated with the issue. The ITS feature information displayed is drawn from the IT data store 124. Displaying feature flag information in the IT system issue view interface allows users of the IT system to see certain feature flag information without having to navigate to or otherwise access the FF system.

The IT system may be configured to display various feature flag information in the issue view. The specific information that can be displayed will depend on the implementation that the information that the FF system provides to the IT system (for example in a feature flag update as described above with respect to Table A).

Continuing the example of Table A, and in certain embodiments, the issue view interface may display one or more of: a display name (i.e. a human defined name for the feature flag other than its unique identifier); a URL linking to summary information; feature flag status information that indicates whether the feature flag associated with the issue is on or off; feature flag rollout information that provides an indication of the extent of the feature flag roll out (for example a percentage of customers the feature has been rolled out to); feature flag rule information indicating for example the number of rules associated with the feature flag.

Where a feature flag is associated with different environments the feature flag information displayed may also include environment specific information. For example, if a particular feature flag has a development environment, staging environment, and production environment, information on the rollout/rules/etc. may be displayed for each different environment.

In certain embodiments, the IT system is further configured to display or provide a feature flag link. The feature flag link is configured to link directly to the specific feature flag that the issue is associated with in the FF system.

At 606, the IT client 112 detects activation of the feature flag link, for example by a user contacting, clicking on, or otherwise interacting with the link.

At 608, in response to detecting activation of the feature flag link, the IT system effects a redirect to the FF system, and in particular to an interface in respect of the specific feature flag indicated by the feature flag link/associated with the issue. As described above, this redirection may be performed in various ways. As part of the redirection the IT system (e.g. the IT server 122) provides credentials to the FF system (e.g. the FF server 132). This allows for automatic authentication of the user by the FF system (i.e. without requiring any further user interaction).

Figure 7:
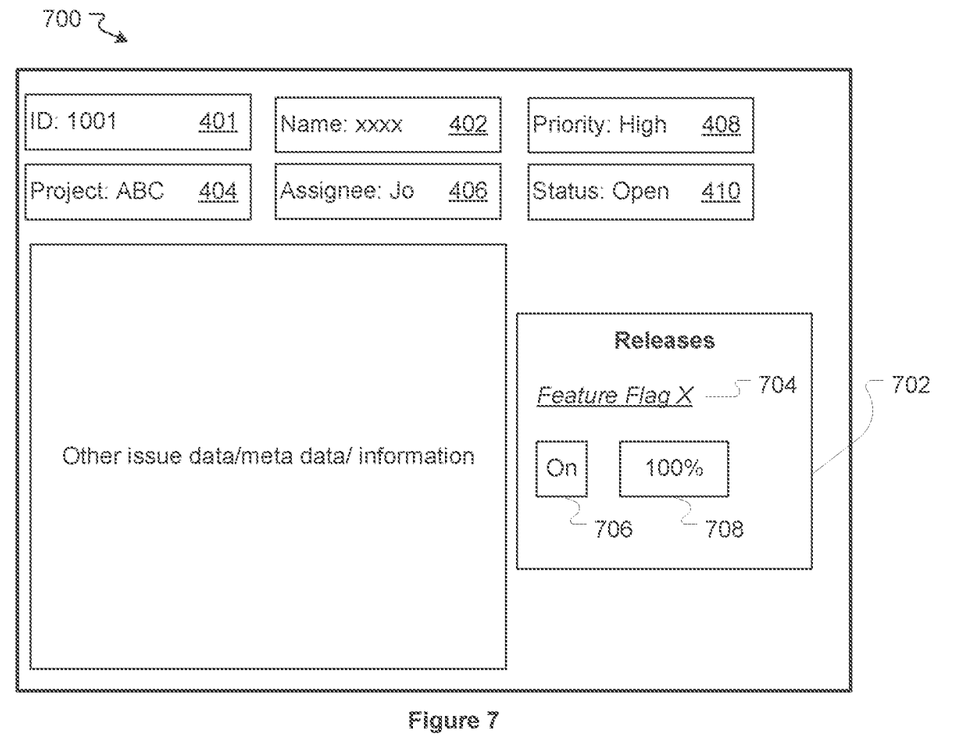
FIG. 7 is an example issue tracking system user interface for viewing/interacting with an issue that has been associated with a feature flag.

FIG. 7 provides one example of an IT system issue view user interface 700 in respect of an issue associated with a feature flag. As with issue view interface 400, interface 700 displays a number of general issue details (the same reference numerals have been used and these elements will not be described again).

User interface 700 further includes a releases section/pane 702. The releases pane 702 includes a feature flag link control 704, the text of which (in this instance) is the name or identifier of the feature flag. The link control 704 can be activated by a user (e.g. by clicking, contacting, or otherwise interacting) to cause the user to be redirected to the feature flag in the FF system.

Release pane 702 further includes a feature flag status indicator 706 which displays the feature flag status information—i.e. information indicating whether the feature flag is turned on or not. In this example the text of the status indicator 706 is 'On', indicating the feature flag is turned on (as opposed, for example, to 'Off' which would indicate the feature flag is turned off). In Release pane 702 further includes a roll out indicator 708 that displays the feature flag roll out information. In this particular example, the roll out indicator displays "100%", indicating the feature has been rolled out to all customers (as opposed to another number, e.g. n %, indicating that the feature has been rolled out to n % of customers). Roll out indicator 708 may be displayed in release pane 702 by default or may be caused to be displayed by a user action (for example, hovering over or otherwise interacting with the roll out indicator 708).

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method comprising:
    receiving, by an issue tracking system, a request to associate an issue maintained by the issue tracking system with a feature flag maintained by a feature flag system;
    generating, by the issue tracking system, feature flag system issue data;
    redirecting, by the issue tracking system, to the feature flag system and communicating the feature flag system issue data to the feature flag system;
    receiving, by the issue tracking system, a feature flag update from the feature flag system;
    extracting, by the issue tracking system, feature flag data from the feature flag update;
    associating, by the issue tracking system, the feature flag data with the issue;
    generating, by the issue tracking system, an issue view user interface, the issue view user interface comprising issue display information and feature flag display information, the feature flag display information comprising feature flag status information indicating whether a feature associated with the feature flag has been enabled; and
    causing display of, by the issue tracking system, the issue view user interface on a user device.

2. The computer implemented method of claim 1, wherein associating the feature flag data with the issue further comprises storing the feature flag data in a data store of the issue tracking system.

3. The computer implemented method of claim 1, wherein the feature flag display information comprises feature flag rollout information indicating an extent to the feature associated with the feature flag has been rolled out.

4. The computer implemented method of claim 1, wherein:
    the issue tracking system comprises an issue tracking client operating on the user device and an issue tracking server operating on an issue tracking sever system;
    the request to associate the issue with the feature flag is received by the issue tracking client and communicated by the issue tracking client to the issue tracking server;
    the issue display information and the feature flag display information are received by the issue tracking client from the issue tracking server; and
    the issue tracking client causes display of the issue view user interface on the user device.

5. The computer implemented method of claim 4, wherein:
    the feature flag system comprises a feature flag client operating on the user device and a feature flag server operating on a feature flag sever system;
    the issue view user interface further comprises a feature flag link; and
    the method further comprises:
        detecting, by the issue tracking client, activation of the feature flag link; and
        in response to detecting activation of the feature flag link:
            redirecting, by the issue tracking system, to the feature flag system;

receiving, by the feature flag client from the feature flag server, feature flag information corresponding to the feature flag; and causing, by the feature flag client, display of a feature flag user interface on the user device, the feature flag user interface including the feature flag information.

6. The computer implemented method of claim 1, wherein the request is a request to associate the issue with an existing feature flag.

7. The computer implemented method of claim 1, wherein the request is a request to associate the issue with a new feature flag.

8. The computer implemented method of claim 1, wherein communicating the feature flag system issue data to the feature flag system comprises generating, by the issue tracking system, a redirect URL, the redirect URL comprising one or more parameters for conveying the feature flag system issue data.

9. An issue tracking system comprising:
a processor,
a communication interface, and
a non-transitory computer-readable storage medium storing sequences of instructions which, when executed by the processor, cause the processor to:
receive, via the communication interface, a request to associate an issue maintained by the issue tracking system with a feature flag maintained by a feature flag system;
generate, by the processor, feature flag system issue data;
redirect to the feature flag system and communicate the feature flag system issue data to the feature flag system;
receive, via the communication interface, a feature flag update from the feature flag system;
extract, by the processor, feature flag data from the feature flag update;
associate the feature flag data with the issue;
generate an issue view user interface, the issue view user interface comprising issue display information and feature flag display information, the feature flag display information comprising feature flag status information indicating whether a feature associated with the feature flag has been enabled; and
cause display of the issue view user interface on a user device.

10. The issue tracking system of claim 9, wherein, to associate the feature flag data with the issue, the sequences of instructions further cause the processor to store the feature flag data in a data store of the issue tracking system.

11. The issue tracking system of claim 9, wherein the feature flag display information comprises feature flag rollout information indicating an extent to the feature associated with the feature flag has been rolled out.

12. The issue tracking system of claim 9, wherein:
the issue tracking system comprises an issue tracking client operating on the user device and an issue tracking server operating on an issue tracking sever system;
the request to associate the issue with the feature flag is received by the issue tracking client and communicated by the issue tracking client to the issue tracking server;
the issue display information and the feature flag display information are received by the issue tracking client from the issue tracking server; and
the issue tracking client causes display of the issue view user interface on the user device.

13. The issue tracking system of claim 9, wherein the request is a request to associate the issue with a new feature flag.

14. The issue tracking system of claim 9, wherein the request is a request to associate the issue with an existing feature flag.

15. The issue tracking system of claim 9, wherein communicating the feature flag system issue data to the feature flag system comprises generating a redirect URL, the redirect URL comprising one or more parameters for conveying the feature flag system issue data.

16. A computer implemented method comprising:
receiving, by a feature flag system, issue data corresponding to an issue maintained by an issue tracking system, the received issue data including an issue key that identifies the issue in the issue tracking system;
creating, by the feature flag system, a new feature flag;
automatically assigning, by the feature flag system, one or more feature flag attributes to the new feature flag, the one or more feature flag attributes extracted from the received issue data;
receiving user defined attributes and assigning the user defined attributes to the new feature flag;
generating a feature flag update, the feature flag update comprising feature flag data that includes the received issue data and the user defined attributes corresponding to the new feature flag; and
communicating the feature flag update to the issue tracking system.

17. The computer implemented method of claim 16, wherein the received issue data is received in one or more parameters of a URL directed to the feature flag system.

* * * * *